United States Patent
Silakov

(10) Patent No.: US 11,556,334 B2
(45) Date of Patent: Jan. 17, 2023

(54) SYSTEMS AND METHODS FOR GRADUALLY UPDATING A SOFTWARE OBJECT ON A PLURALITY OF COMPUTER NODES

(71) Applicant: Virtuozzo International GmbH, Schaffhausen (CH)

(72) Inventor: Denis Silakov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

(21) Appl. No.: 17/137,843

(22) Filed: Dec. 30, 2020

(65) Prior Publication Data

US 2022/0206783 A1    Jun. 30, 2022

(51) Int. Cl.

| | | |
|---|---|---|
| *G06F 8/658* | (2018.01) | |
| *G06F 9/50* | (2006.01) | |
| *G06F 8/61* | (2018.01) | |
| *G06F 11/34* | (2006.01) | |
| *G06F 21/10* | (2013.01) | |
| *G06F 9/54* | (2006.01) | |

(52) U.S. Cl.
CPC ............... *G06F 8/658* (2018.02); *G06F 8/61* (2013.01); *G06F 9/5083* (2013.01); *G06F 9/542* (2013.01); *G06F 11/3409* (2013.01); *G06F 21/105* (2013.01)

(58) Field of Classification Search
CPC .... G06F 9/542; G06F 9/5083; G06F 11/3409; G06F 21/105; G06F 8/65; G06F 21/54; G06F 8/656; G06F 8/60; G06F 8/61; G06F 8/658
See application file for complete search history.

(56) References Cited

U.S. PATENT DOCUMENTS

| | | | | |
|---|---|---|---|---|
| 6,799,214 B1 * | 9/2004 | Li | ............... | H04L 67/101 709/219 |
| 7,251,688 B2 * | 7/2007 | Leighton | ............... | H04L 67/101 709/224 |
| 11,163,669 B1 * | 11/2021 | Torun | ............... | G06F 11/3692 |
| 2001/0025313 A1 * | 9/2001 | Feng | ............... | G06F 9/505 709/213 |
| 2003/0046675 A1 * | 3/2003 | Cheng | ............... | H04L 67/34 717/173 |

(Continued)

*Primary Examiner* — Wei Y Zhen
*Assistant Examiner* — Brahim Bourzik
(74) *Attorney, Agent, or Firm* — ArentFox Schiff LLP; Michael Fainberg

(57) ABSTRACT

Disclosed herein are systems and method for gradually updating software object instances on a plurality of computer nodes. In an exemplary aspect, in response to receiving a notification from a software object instance, a system may register the software object instance at an update server. The system may store and deploy a plurality of links, wherein each deployed link uniquely corresponds to a registered software object instance. The system may then associate two or more subsets of the plurality of links with two or more update locations, in accordance with an update policy. The system may place an update to the software object instance at the two or more update locations in accordance with an update policy. In response to receiving an update request via a link from a computing node, the system may further redirect the update request to an update location associated with the link.

13 Claims, 9 Drawing Sheets

(56) References Cited

U.S. PATENT DOCUMENTS

2006/0259594 A1\* 11/2006 Paliwal .................... G06F 8/61
 709/220
2007/0074198 A1\* 3/2007 Gassoway ............... H04L 67/34
 717/168

\* cited by examiner

SYSTEMS AND METHODS FOR GRADUALLY UPDATING A SOFTWARE OBJECT ON A PLURALITY OF COMPUTER NODES

FIELD OF TECHNOLOGY

The present disclosure relates to the field of software updates, and, more specifically, to systems and methods for gradually updating a software object on a plurality of computer nodes.

BACKGROUND

Most software developers periodically release updates for their products where they fix known issues and introduce new functionality. But besides new features and fixes, these updates may contain undesirable effects such as new bugs and performance degradation. Though most updates are tested thoroughly before publishing, developers cannot guarantee that the updates are free of problems and accordingly do not want all their customers to update to a new version. Instead, they prefer to distribute updates gradually.

Although there exist ad-hoc solutions with manual selection of users who get updates immediately, existing solutions for gradual updates delivery are too generic and do not take into account specific attributes of complex software systems—in particular, hyper-converged systems that unite ordinary machines into clusters with distributed storage and virtual environments running on top of it.

SUMMARY

To address these shortcomings, aspects of the disclosure describe methods and systems for gradually updating software object instances on a plurality of computer nodes. In an exemplary aspect, in response to receiving a notification from a software object instance of a plurality of software object instances installed on a plurality of computing nodes, a method may register the software object instance at an update server. The method may store and deploy a plurality of links, wherein each deployed link uniquely corresponds to a registered software object instance. The method may then associate two or more subsets of the plurality of links with two or more update locations, in accordance with an update policy. The method may place an update to the software object instance at the two or more update locations in accordance with an update policy, wherein the update policy defines a distribution of computing nodes that are allowed to receive the update via each of the two or more update locations and time latencies between placing the update at different update locations. In response to receiving an update request via a link from a computing node, the method may further redirect the update request to an update location associated with the link.

In some aspects, the method may redirect the update request by verifying a license key of the software object instance, and in response to determining that the license key is valid, redirecting the update request.

In some aspects, the method may place the update by placing, at a first time by the update server, the update at a first update location of the two or more update locations, and placing, at a second time by the update server, the update at a second update location of the two or more update locations.

In some aspects, the method may further determine respective deployed links of the plurality of links to associate with the first update location and the second update location.

In some aspects, a first cluster of the plurality of computing nodes is to be updated before a second cluster of the plurality of computing nodes based on the update policy, and accordingly links of the first cluster are associated with the first update location and links of the second cluster are associated with the second update location.

In some aspects, prior to placing the update at the second update location, the method may determine whether a functionality or performance issue in instances retrieving the update from the first update location was detected subsequent to updating the software object instance via the first update location. In response to determining that the functionality or performance issue was not detected, the method may place the update at the second update location.

In some aspects, the method may monitor whether a computing node of the plurality of computing nodes has an active status based on whether communication is received from a respective instance installed on the computing node, wherein the respective instance of the computing node accesses the update via a respective link associated with the first update location. In response to determining that the computing node does not have an active status, the method may rebalance an amount of links associated with the first update location and the second update location.

In some aspects, the method may register the software object instance by storing, at the update server, a plurality of attributes of the software object instance, wherein the plurality of attributes includes at least one of: a hardware ID, a software version, and a cluster ID.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for gradually updating a software object on a plurality of computer nodes. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
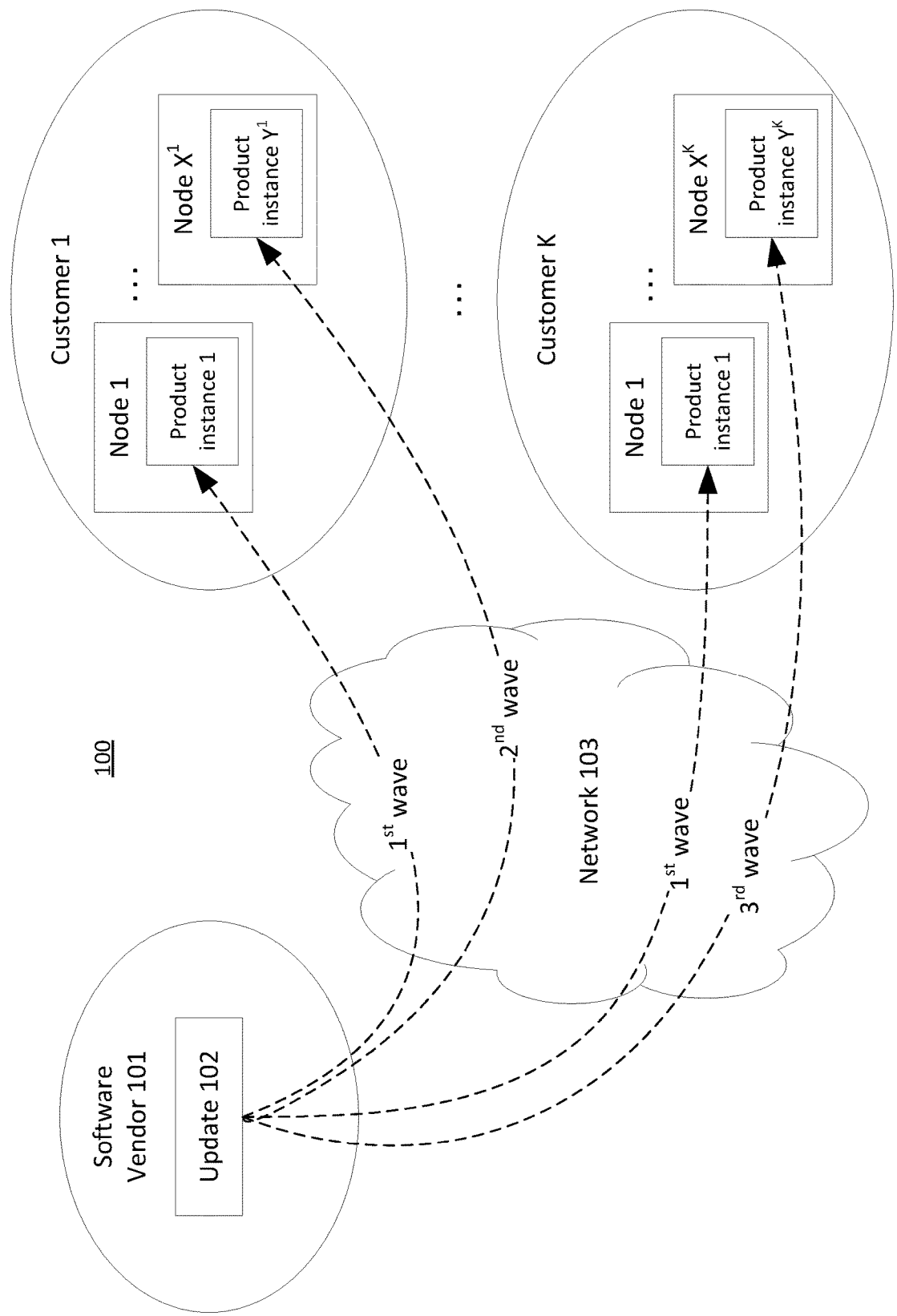
FIG. 1 is a block diagram illustrating a system for gradually updating a software object on a plurality of computer nodes.

FIG. 1 is a block diagram illustrating system 100 for gradually updating a software object on a plurality of computer nodes according to an exemplary aspect. In an aspect shown on the FIG. 1, software vendor 101 distributes update 102 to computing nodes (e.g., belonging to various customers) over network 103 (e.g., the Internet). This distribution takes place over several waves. In the first wave shown in FIG. 1, node 1 of both customer 1 and customer K receive an update for the software object instance (used interchangeably with product instance). In the second wave, node X' of customer 1 receives the update. In the third wave, node $X^K$ of customer K receives the update. Each of the updates may be delayed by a certain time period (e.g., 1 day). The present disclosure describes an automated approach for delivering updates for software object instances, in for example, hyper-converged systems (e.g., the systems of customers 1-K). The approach improves update safety for customers and, at the same time, guarantees that a given percent of customers get updates immediately (e.g., $1^{st}$ wave) and the others—only after some delay (e.g., second and third waves).

In an exemplary aspect, product instance(s) (e.g., product instance Y) on a node (e.g., node X) look for updates over network 103 using a unique link (e.g., a Uniform Resource Locator (URL)), which can be configured for every product instance independently.

Figure 2:
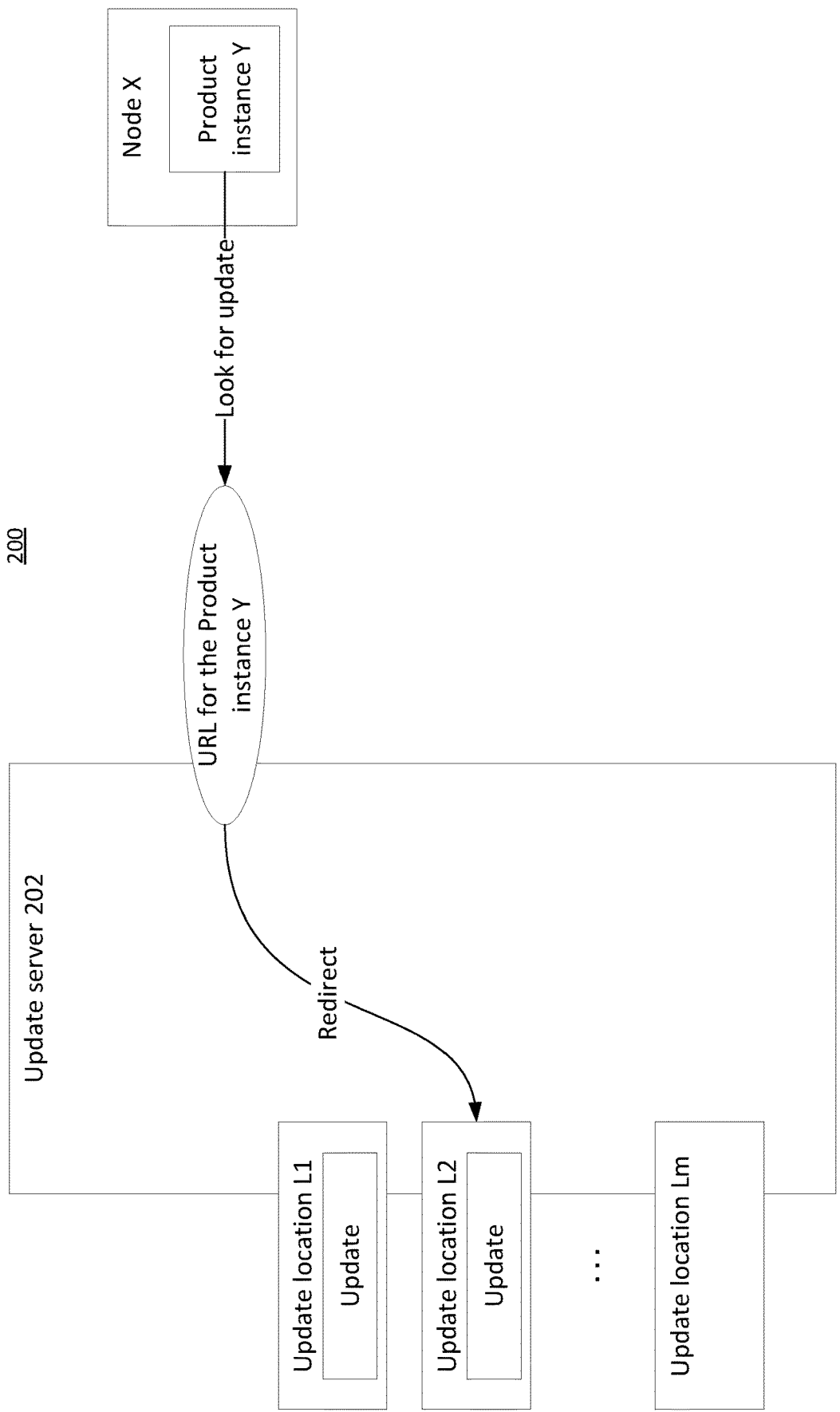
FIG. 2 is a block diagram illustrating an example of redirecting links.

FIG. 2 is a block diagram illustrating example 200 of redirecting links. Update server 202 of software vendor 101 may maintain links and redirect the links to various update locations (e.g., update locations L1, L2, . . . , Lm). As can be seen in FIG. 2, update locations may either be on update server 202, or on another server connected to update server 202 via some connection (e.g., via network 103). In some aspects, link redirections may be implemented using web server redirects or file system links (e.g., symlinks).

Figure 3:
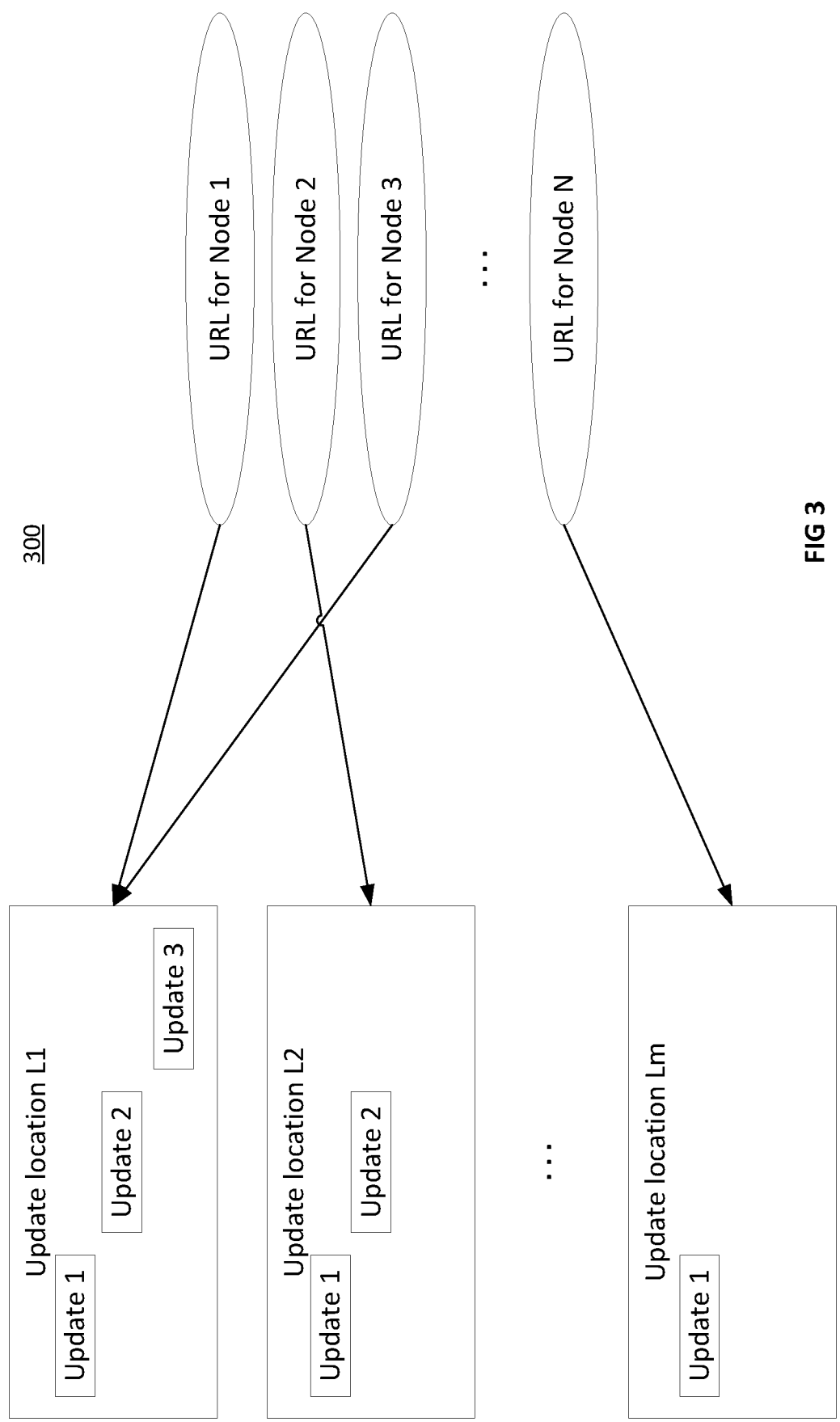
FIG. 3 is a block diagram illustrating an example of placing updates in different update locations.

FIG. 3 is a block diagram illustrating example 300 of placing updates in different update locations. Example 300 firstly depicts the structure of update server 202 (i.e., how update server 202 maintains redirection between links and update locations). Update server 202 maintains a separate unique link for every instance of a node. Every such link redirects to a real location based on an update policy chosen for the node. A node can be a physical machine, a virtual machine, or a container. In other words, a node may be where a product instance is installed, or may be the product instance itself.

In FIG. 3, each update location may store different updates. For example, in FIG. 3, update location L1 stores three updates (1-3). In one aspect, a software object may be a client application or a driver for a hardware device connected to or within a node, an operating system, a hyper-converged system, etc. Update server 202 may maintain a URL for node 1, wherein the URL points to update location L1. Update server 202 may maintain a URL for node 3, which also points to update location L1. Accordingly, software object instances on nodes 1 and 3 may monitor for and detect updates 1-3, and initiate the updating process. It should be noted that update location Lm has Update 1, which means that for corresponding nodes only $1^{st}$ wave have been started. Update server 202 may assign a link to node N that points to update location Lm. Updates 2-3 are not yet accessible to node N.

As stated before, the present disclosure discusses a gradual updating procedure. In one aspect, during a second wave, nodes 2-N may, for example, gain access to update 3. During a third wave, node N may gain access to update 2. In some aspects, update server 202 may facilitate this access by either redirecting the link of a node to a different location (e.g., have URL of node 1 point to update location L2 in a subsequent wave), or placing an update in a different location (e.g., including update 2 in update location Lm).

Figure 4:
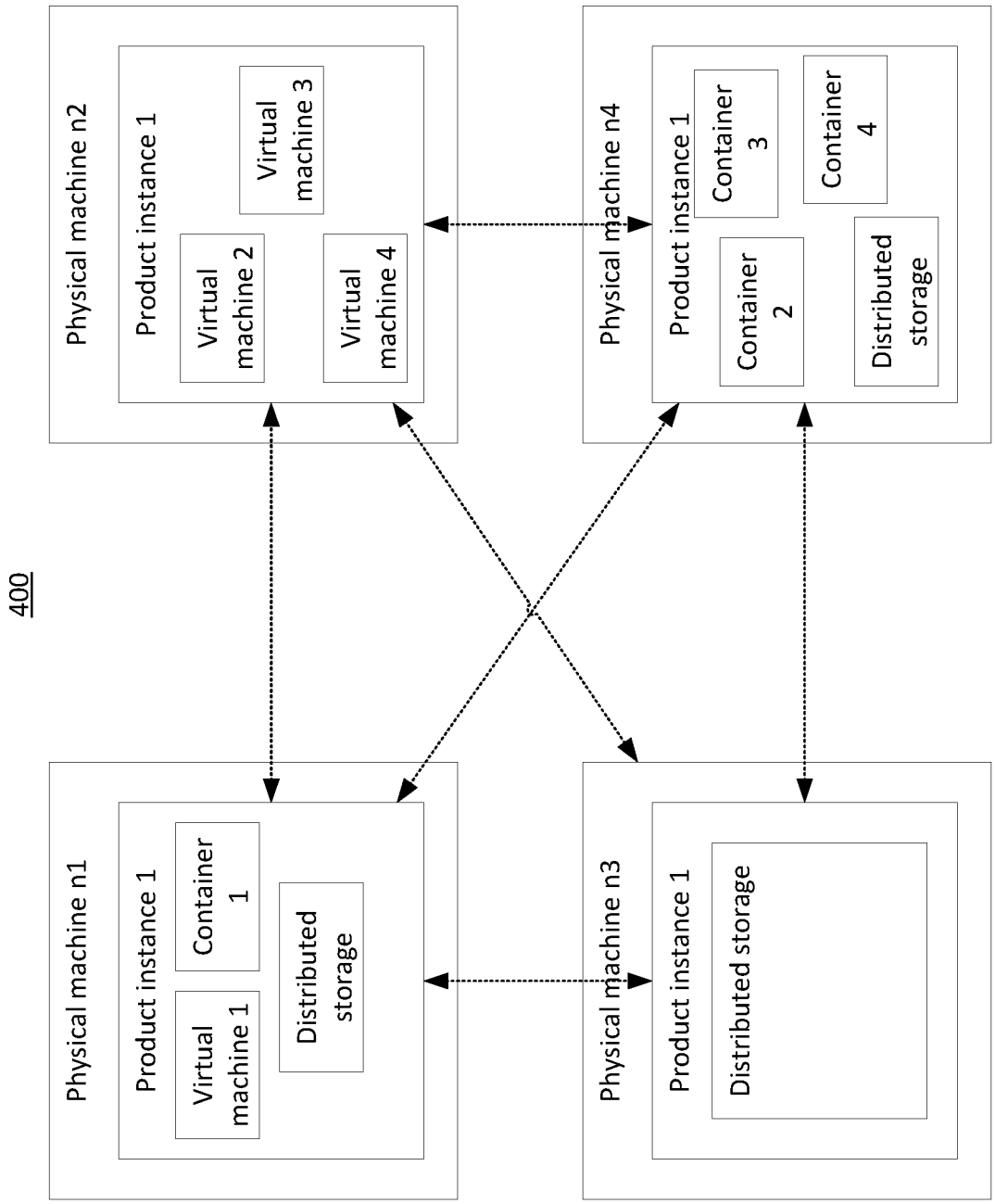
FIG. 4 is a block diagram illustrating an example of a cluster of nodes.

FIG. 4 is a block diagram illustrating an example of a cluster of nodes. FIG. 4 explores an ability of nodes to be combined into clusters. In one aspect, a computing node may send to the update server a notification that it is a part of a cluster. In one aspect, in such case links (URL) of all node of a cluster may be redirected to the same update location. An example of a product that creates clusters is a case where the product is used for creation of a hyper-converged infrastructure, or a cloud infrastructure. A hyper-converged infrastructure merges elements of a traditional data center such as storage, compute, networking and management in a unified software-defined system. Such infrastructures use software and servers to replace expensive, dedicated hardware. With hyperconverged infrastructure, data center complexity is decreased and scalability is increased.

For example, a product can include compute components such as virtual execution environments (e.g., virtual machines) and containers (e.g., system/stateful or application/stateless containers), and storage components (e.g., distributed or software defined, or erasure coding storage). In example 400, all shown nodes (e.g., physical machines) are parts of a cluster and each product instance can communicate with another product instance. The nodes within the cluster can also balance load between each other. For example, virtual machines (VMs) and/or containers (CTs) can be migrated or live migrated from one node in the cluster to another. In this case, some instances may comprise both compute and storage components, some may have one or the other. It should be noted that, one customer may be, in some aspects, an owner or administrator of several clusters. In some aspects, the software vendor may be also have computing nodes (or clusters) with the software object instances, that are to be updated using the update server and unique links.

There are particular expectations and requirements associated with updating product instances in hyper-converged systems. For example, it is often desired to have the same version of cluster software to be run on all nodes in a cluster to avoid incompatibilities between different versions. Suppose that every machine in the cluster is used to run virtual environments (VEs) (e.g., virtual machines or containers) such as VMs 1-3 on physical machine n2. Some software updates, such as operating system (OS) kernel updates, require system reboot. This may lead to downtime of all VEs on the node being rebooted. In other words, when physical machine n2 requires a reboot, VMs 1-3 will be inaccessible during the reboot downtime. The downtime might become very notable in a case where an error originates in the updated machine n2. It is thus also desired to reboot cluster nodes one by one to avoid situations where too many nodes are offline and the remaining ones are overloaded. These expectations and requirements can be met using the methods of the present disclosure (e.g., links, redirection, latency, etc.).

Figure 5:
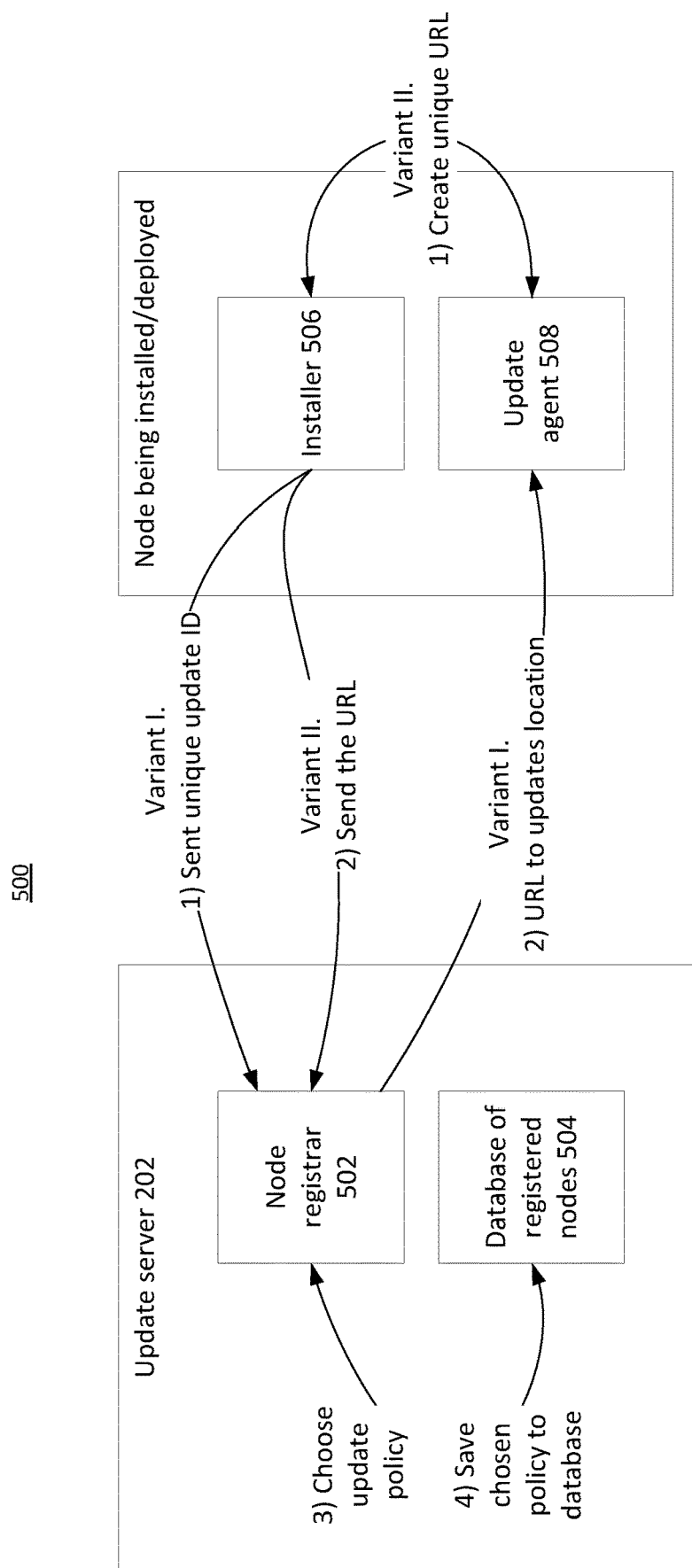
FIG. 5 is a block diagram illustrating an example of creating a unique link corresponding to the software object instance.

FIG. 5 is a block diagram illustrating example 500 of creating a unique link corresponding to the software object instance. Firstly, a software object instance is installed (or set up) and is registered at update server 202 (so that the server is aware of the product instance). Update server 202 maintains unique links (e.g., URLs) for software object instances installed on a plurality of computer nodes. These links are used by the software object instances to look for updates.

In some aspects, the software object instance is a client of update server 202. This is described as variant I in example 500. For example, during the initial product installation on a computing node, installer 506 informs node registrar 502 of update server 202 that a software object instance has been installed on a node. An update link is then generated by node registrar 502 that is unique to the node. Update server 202 may generate links based on any node-specific parameter (either hardware or software) such as a license key, a MAC address of network adapters, etc. The node-specific parameter serves as a unique update identifier (ID) that is provided by installer 506.

In another aspect, when a software object instance is installed, the product instance creates the link and sends it to node registrar 502 of updates server 202. This is described as variant II in example 500. Node registrar 502 then utilizes the received link for providing updates to the node.

In one aspect, both the update server 202 and the update agent 508 are aware of the link. Update agent 508 may be a part of the product instance or may work in parallel with the product instance. In one aspect, the update agent 508 is responsible for updating the product instance and for communicating with the update server 202. In one aspect, update agent 508 periodically checks a configured link for updates and automatically installs them if found. Update server 202 utilizes an update policy to perform gradual updates to computer nodes.

In one aspect, an update policy is a collection of rules that define when, what, and how updates are provided to a given node/instance (e.g., what and when is an update put into which locations). For example, an update policy may indicate when an update is placed in a particular location, which link are directed to the location, whether the node needs to be rebooted, time latencies between subsequent update waves, special policies for particular nodes or clusters (e.g., cases when the node is part of a cluster (all links of nodes of a cluster may be to the same update location), or when the node has many CPUs and a lot of memory, etc.), whether health checks are needed to ensure that a node does not have functionality and performance issues after an update, and whether to notify an administrator of the update server update's wave completion. Update policies may be stored at update server 202. An update policy may be customized for each instance or node in a cluster. In some aspects, an update policy is automatically selected by update server 202. The selected update policy is stored in database of registered nodes 504. Accordingly, prior to placing updates in a particular location accessible to a node by an assigned link, update server 202 may refer to the update policy of the instance or node and determine how and when to place the update.

Figure 6:
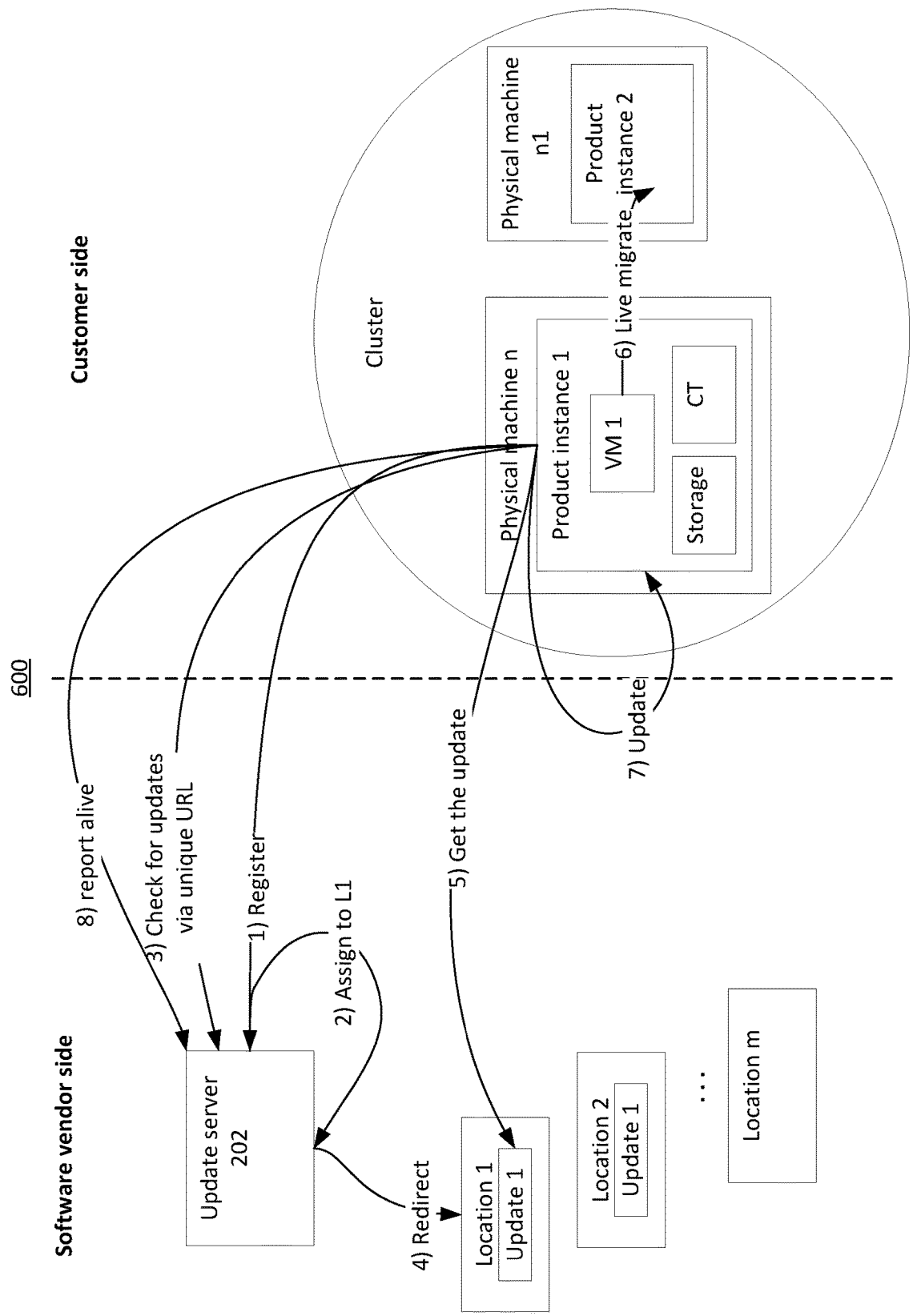
FIG. 6 is a block diagram illustrating an example of interactions between an update server and a computing node.

FIG. 6 is a block diagram illustrating example 600 of interactions between an update server and a computing node. Because computing nodes that are included in the same cluster cooperate with each other, update server 202 may have a separate update policy for nodes in clusters (in one aspect, the product instance can report to update server 202 that it is a part of a cluster). In some aspects, this update policy can be set up separately for each customer or each cluster. In other aspects, all nodes from one cluster are associated with the same update location. Although nodes in a cluster preferably should all have the same version (i.e., one node cannot wait for an update for a week after another peer node is updated), they cannot all be updated simultaneously (e.g., due to downtime issues). In one aspect, nodes from one cluster refer to the same update location and are not updated all at the same time (e.g., they may be updated sequentially, or there may be a threshold, for example, not more that X nodes may be updated simultaneously, etc.). This reduces load balancing and service availability issues and processing power depletion. In some aspects, update server 202 may avoid a simultaneous update through an update policy or through a redirecting algorithm. Or, update agents may keep an exclusive lock (e.g., at least one lock for a cluster) on a distributed storage. When a node detects a new available update, the node may request to be unlocked. Only when the unlock is obtained can an update process be launched. In one aspect, when update server 202 is ready to start a wave, the update may begin (i.e., an update may be placed in a location accessible via the link assigned to the given node).

In one aspect, if it is determined (e.g., according to the update policy), that a node reboot will be required after an update, then all VEs from the node may be migrated to other node(s) in the cluster before an update starts. In one aspect, an update policy may further require that a migration be performed before an update can be started, e.g., by informing update agents. In one aspect, when the node is successfully rebooted, the VEs may be migrated back, and/or the node may get VEs from the node that will be updated next. In some aspects, when one node is successfully updated, the exclusive lock is released so that other nodes in a cluster may proceed with updates.

In one aspect, every software object instance informs update server 202 when the instance becomes a part of a cluster (or changes a cluster). Update server 202 stores information about all deployed clusters and, for example, ensures that all nodes from the same cluster are assigned to the same update policy, or maintains special rules for some clusters (e.g., in case of beta-testing programs).

Update server 202 may also track "live" nodes/product instances so that resources are not wasted in serving/maintaining links for "dead" or unavailable nodes. For example, every product instance may periodically (e.g., once a month) inform update server 202, via an update agent, that the instance is still alive or use its assigned link to check for updates, so that server 202 can track "dead" nodes and stop serving the corresponding update links. In some aspects, if an instance does not request or query for updates via its assigned link for a predetermined period of time, update server 202 may label the instance as "dead" or "unavailable."

In some aspects, update server 202 may check a product instance's license when the product instance connects to update server 202 to determine whether one exists or has expired. If a license is invalid or has expired, the redirection to the update location is not performed. In some aspects, the link associated with the product instance may not be maintained, or may not be generated, or if generated, may be considered "dead."

At any given time, update server 202 maintains at least two update locations (e.g., locations L1, L2, . . . , Lm, m−number of locations), wherein a first update location may receive updates immediately, while the remainder receive them after periods of time (e.g., t1 (in one aspect, the first one also receives updates with latency; in other aspect, t1=0), t2, . . . , tm). The number of update locations can be modified and the amount of time that an update exists in a particular update location can also be modified by update server 202. When the update appears in a certain update location, an update wave starts and product instances may begin updates (e.g., by first downloading the update).

In one aspect, update server 202 is parametrized such that an administrator of update server 202 (e.g., at the software vendor's side) can set the percent (P1) of customers or their nodes, or their clusters that receives updates in a first update wave. In one aspect, this percentage may be stored in an update policy associated with a cluster (where nodes in that cluster share an update policy). The update policy may further indicate percentages of customers/nodes/product instances/clusters that get updates after every delay period—P2, P3, etc. In addition, the percentages can be kept not only for all product instances, but for every customer or cluster, separately. There also may be separate policies for product instances that do not belong to any cluster. In one aspect, P1, . . . , Pm % are set not for number of nodes, but for number of clusters.

When update server 202 gets information about a new product installation(s), update server 202 decides which update location(s) should be used for the product installation(s) and assigns the new link to the update location(s) accordingly. The decision logic aims to maintain balance between a current number of nodes in locations L1, L2, . . . , Lm and desired P1, P2, etc., values.

In some cases, server 202 may re-balance links to better fit to P1 Pn parameters. For example, when update server 202 detects a "dead" link that should no longer be served or when a computing node's license to use a software object instance expires, server 202 may not only remove corresponding links from a maintained list, but also re-balance the other links in the list. Server 202 may re-balance the links, when one or several product instances (or a whole cluster) are found to be "unavailable," when an administrator of update server 202 makes a manual requests, when a predetermined time has passed, when the balance is far from desired parameters P1, . . . , Pm (e.g., where one cluster becomes too big), or based on a difference between the existing distribution on the desired distribution.

In one aspect, update server 202 may also perform health checks of recently updated instances. For example, each product instance may send to update server 202 a report of whether the update installation was successful. If update server 202 does not get such acknowledgment from a product instance, which has accessed its assigned link, even after a period of time (which can be set during update server set up and may be different for different updates, e.g., half an hour, etc.), then the update of the product instance is deemed unsuccessful.

In one aspect, if some problems are detected with an update (e.g., as reported by an update agent), update server 202 may "revoke" the update by removing the update from a location where the update is already published and preventing other locations from getting the update. In some cases, the update may be revoked by creating a new update, which during its installation, will revert back the changes that led to errors in the previous update.

Update server may even have different parameters and policies for different updates or different types of updates. For example, updates may have different types and "importance". In one aspect, security updates (i.e., most important, or critical) may be immediately put into all possible locations or with shorter delays between consecutive update waves.

Additionally, in one aspect, update server 202 may have (or may be connected to) an update store (e.g., a place that stores all updates ready to be sent to the computing nodes) from which update server 202 pulls updates. Referring to FIG. 6, location L1 may act as such update store.

In one aspect, update server 202 may also maintain a database with information about alive nodes and use it according to the policy (e.g., to compute the number of nodes in a cluster to assign to an update location during rebalancing).

The decision logic for assigning new nodes or rebalancing links pointing to a particular update location may be, in some aspects, governed by the following principles: nodes are rarely assigned new update locations, all nodes belonging to one cluster are assigned the same update location, and nodes are assigned to update locations according to a desired distribution (e.g., P1, . . . , Pm). In one aspect, update server 202 may determine whether an existing distribution is "close" or "far" from a desired distribution based on a formula considering an existing percentage of nodes being assigned to locations and desired parameters P1, . . . , Pm and whether the difference exceeds a threshold difference.

There may be different variants and implementations of the decision logic described above. The decision logic may be based on a formula (e.g., depending on the number of nodes in each location). Suppose that there are nodes N1, N2, . . . , Nn (n being a number of nodes), and N is the total amount of nodes. Parameters P1, P2, . . . , Pm (m being a number of locations) represents the percentage of the nodes allocated to a particular location. The decision logic may be governed by a set of rules (e.g., put a node into L1, then put next P2/P1 nodes into L2, and next P3/P1 into L2, etc.) or any algorithm (e.g., minimizing the difference or error between current N1/N and P1 for each location), or a combination of any of such variants, etc. The algorithms may also have different weights for different cases.

The decision logic can be predefined, customizable by an administrator of update server, or defined by the administrator of update server (e.g., during setup of update server 202). The decision logic may be unique to each customer, cluster, set of nodes, nodes with similar parameters, etc., or may be the same for every node with the product instance. The decision logic may consider different customer requirements, nodes hardware parameters (e.g., nodes with high amount of memory and CPU may be considered most important to customers and may be updated according to a separate policy than the rest of the nodes, etc.), location loads, etc.

Suppose that K represents the amount of nodes to be added. One exemplary way of determining where to assign a new node (in case of K=1) is to check how many existing nodes (N1, N2, Nn) are assigned to every location (L1, L2, Lm), divide these numbers by total number of nodes including the number of added nodes (e.g., N+K), and calculate a difference of the results with corresponding parameters— P1, P2, etc. Then, update server 202 may choose the location with the largest difference. If several differences are the same, update server 202 may assign the new node to any of the locations with the largest difference.

For example, suppose that there are two update locations (L1 and L2). A customer may add one new node to their network. The update policy may indicate that the following parameters are set: P1=10%, P2=90% (that is, 10% of nodes should get updates immediately after they are published in a first update wave). If there are already nine instances registered, where one node is assigned to L1 via a link and the other eight nodes are assigned to L2, the additional node with an instance will set the total to 10 nodes. If the node is assigned to L1, the distribution becomes 20% and 80%. This makes the difference between 80% and P2 (i.e., 90%) equal to 10%. Update server 202 may determine this difference and evaluate whether the difference is greater than a threshold difference (e.g., 5%). In response to determining that the difference is greater than the threshold difference, update server 202 may reselect the update location of where to assign the new node. In this case, because assigning the new node to L2 would set the distribution to exactly the desired parameters, update server 202 may place the new node in L2. It should be noted that the technical process of assigning a node to a location involves generating a unique link for the new node and redirecting the link to a particular location (e.g., L2). Update server 202 may attempt to achieve the desired distribution indicated in an update policy using an optimization formula that minimizes the difference between the real distribution and the desired distribution. For example, update server 202 may determine all the locations that a new node can be added to and then assign the node to a location that would put the distribution closest to the desired distribution. In some aspects, update server 202 may rebalance the links (i.e., assign a new location via redirection) at a later time based on the live/dead node counts. It should be noted that the very first registered node is always assigned to the update location that receives updates immediately.

One exemplary variant of rebalancing is, supposed that a removed link was assigned to location Lr. To do rebalancing, update server 202 calculates a sum of current differences D between nodes assigned to every location Lk and corresponding parameter Pk. Then, for every location Lk checked, update server 202 determines a distribution difference if a single link is reassigned from Lk to Lr. If the difference becomes smaller, such a reassignment is performed. The link to be reassigned is chosen randomly. If there are several locations for which node reassignment will reduce the total difference, update server 202 selects the location that leads to the greatest reduction. If there are several such locations, then the one to be used is chosen randomly.

Figure 7:
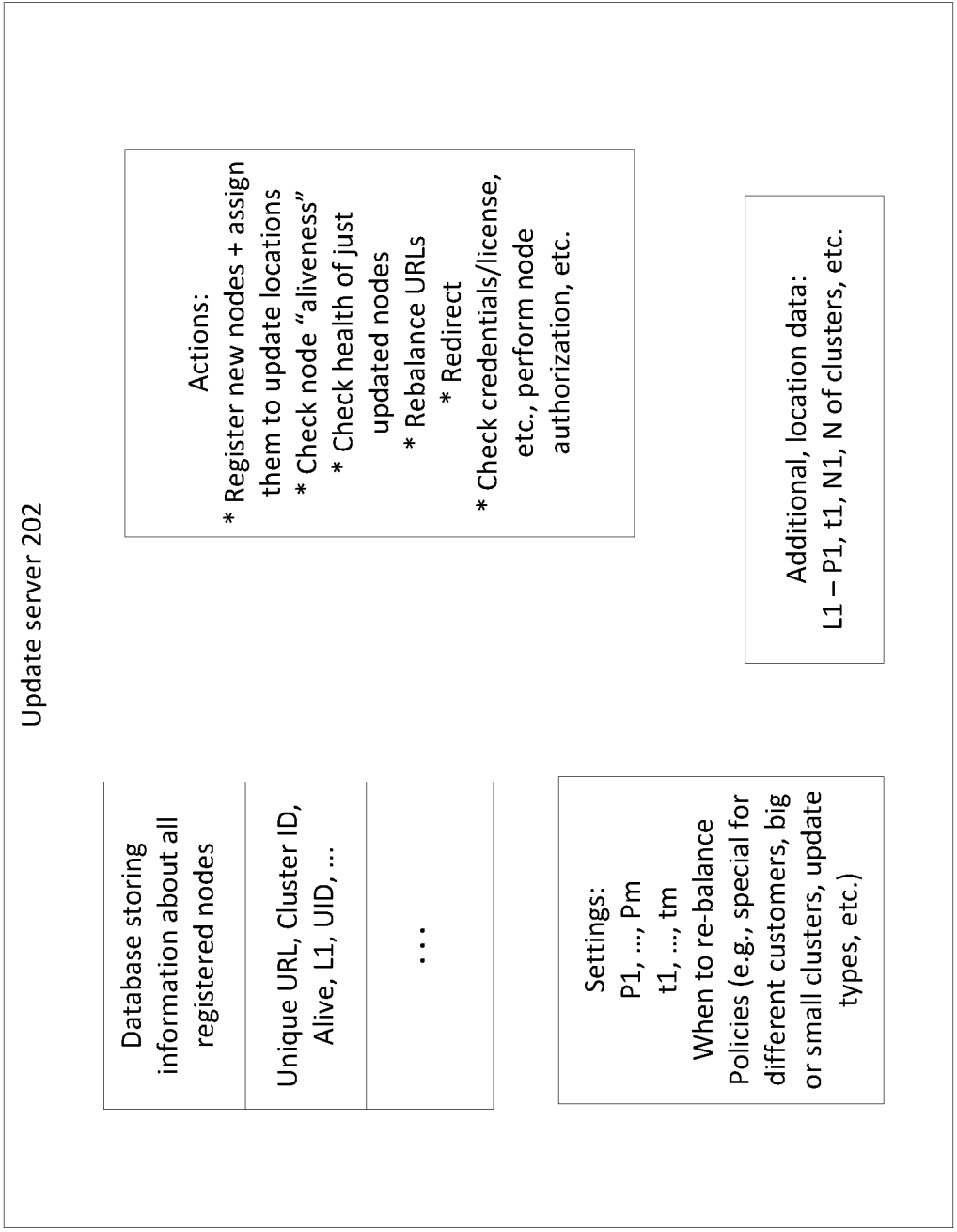
FIG. 7 is a block diagram illustrating an example of components and features in an update server.

FIG. 7 is a block diagram illustrating example 700 of components and features in an update server. As shown in example 700, update server 202 includes a database storing information about all registered nodes. This database includes information regarding the unique link for each node, a cluster ID (if the node is in a cluster), whether the node is alive, the update location that the unique link is directed to, and an associated update policy. Update server 202 may perform various actions such as registering new nodes, assigning them to update locations, checking whether a node is alive, checking the health of just updated nodes, rebalancing links, redirecting links, checking instance license/credential, etc. These actions are governed by update policies that indicate the time between update waves (e.g., t1, . . . , tm) and rebalances, as well as node distributions across update locations (e.g., P1, . . . , Pm).

Figure 8:
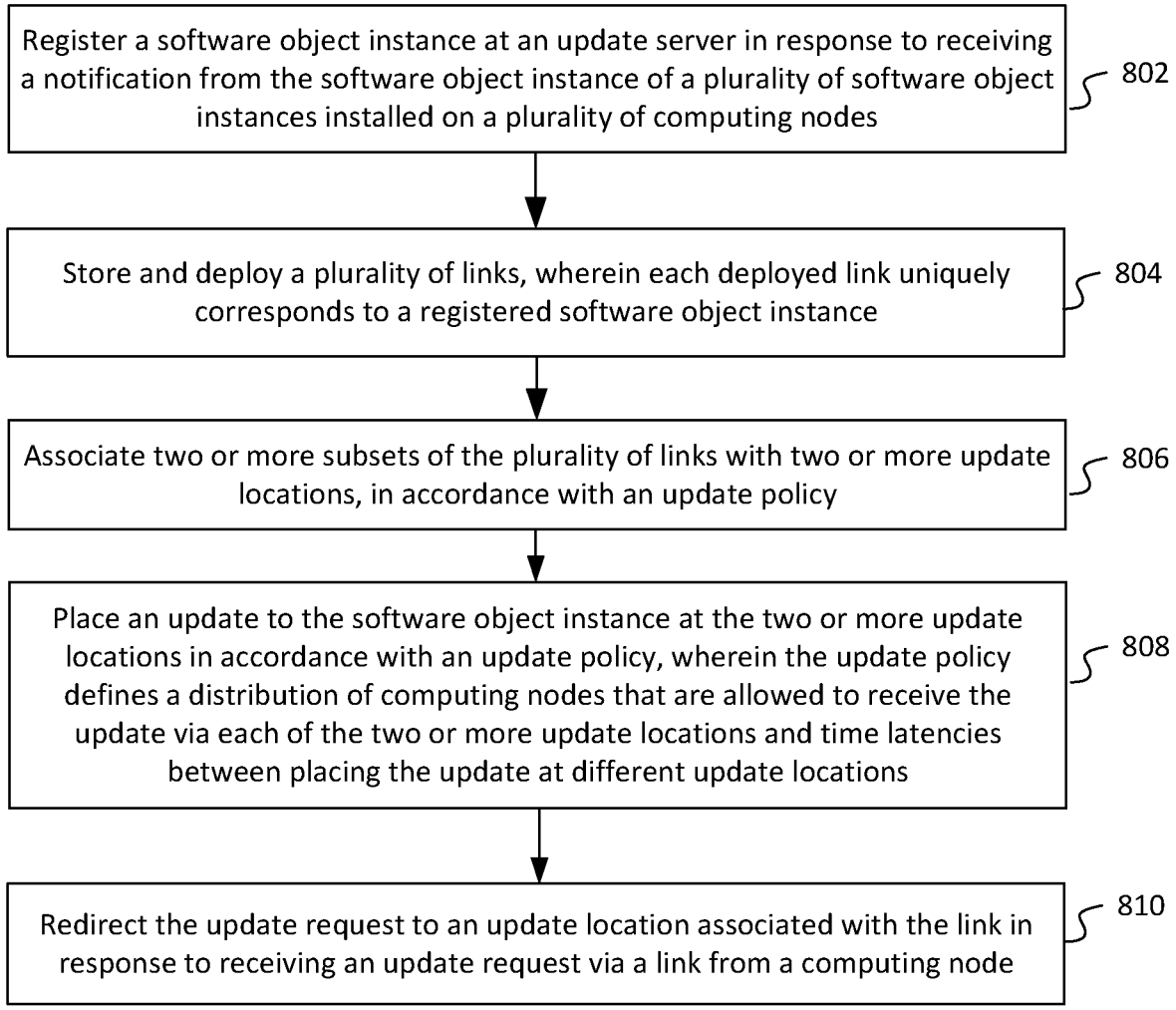
FIG. 8 illustrates a flow diagram of a method for gradually updating a software object on a plurality of computer nodes.

FIG. 8 illustrates a flow diagram of method 800 for gradually updating a software object on a plurality of computer nodes (e.g., node 1, node 2, node 3, . . . node $X^k$). At 802, update server 202 registers each respective instance of the software object (e.g., product instance 1, 2, 3, . . . , $Y^k$) on a respective computer node (e.g., node 1, node 2, node 3, . . . node $X^k$, respectively) in response to receiving a notification from each respective instance. In some aspects, the notification may include a request for registration and a license key of the software object. Update server 202 may verify a license key of each instance of the software object, and only register a respective instance of the software object in response to determining that a respective license key associated with the respective instance is valid. In some aspects, update server 202 may store a plurality of attributes of each respective instance of the software object such as a hardware ID, a software version, and a cluster ID. These attributes may also be provided in the notification.

At 804, update server 202 stores and deploys a plurality of links, wherein each deployed link uniquely corresponds to a registered software object instance. At 806, update server 202 associates two or more subsets of the plurality of links with two or more update locations, in accordance with an update policy. At 808, update server 202 places an update to the software object instance at the two or more update locations in accordance with an update policy, wherein the update policy defines a distribution of computing nodes that are allowed to receive the update via each of the two or more update locations and time latencies between placing the update at different update locations. At 810, update sever 202 redirects the update request to an update location associated with the link in response to receiving an update request via a link from a computing node.

In one aspect, for example, the update policy may indicate that update 2 is to be placed in L1 and L2 for 24 hours before it is placed at Lm (either moved or copied). More specifically, update server 202 may place, at a first time (e.g., Monday at 12 am), update 2 at the subset of update locations (e.g., L1 and L2), wherein computing nodes that have a first subset of deployed links (i.e., URLs that point to L1 and L2) directed to the subset of update locations are configured to access and install the update through links in the first subset. Then, update server 202 may place, at a second time (e.g., Tuesday at 12 am), update 2 at a different subset of update locations (e.g., Lm), wherein computing nodes that have a second subset of deployed links (e.g., URLs that direct to Lm) directed to the different subset of update locations are configured to access and install the update through links in the second subset.

Among the other abilities of update server 202 include instructing a software object on a node to install an update (e.g., by sending a notification that an update is ready or simply putting the update to a corresponding location) via subset of update locations. For example, update server 202 may instruct product instance 1 to pull update 2 from L1.

In some aspects, update server 202 determines respective deployed links of the plurality of links to include in the first subset of deployed links and the second subset of deployed links based on clustering of the plurality of computing nodes. For example, links that point to a particular update location may be assigned to nodes that are part of a cluster. A different set of links that point to another update location may be assigned to nodes that are part of a different cluster. In this case, a first cluster of the plurality of computing nodes is to be updated before a second cluster of the plurality of computing nodes based on the update policy. For example, nodes that belong to the first customer in FIG. 1 are part of a first cluster and nodes that belong to the second customer in FIG. 1 are part of a second cluster. Here, links associated with the first cluster are included in the first subset and links associated with the second cluster are included in the second subset.

In some aspects, prior to placing the update at the different subset of update locations, update server 202 may determine whether a functionality or performance issue in instances associated with the first subset of deployed links was detected subsequent to updating the software object via the first subset of deployed links. For example, before making update 2 in FIG. 3 accessible via Lm, update server 202 may assess whether there were any functionality or performance issues in nodes 1-3 (which had access to L1 and L2). In response to determining that the functionality or performance issue was not detected, update server 202 may place update 2 at the different subset of update locations (e.g., Lm). Examples of functionality and performance issues include, but are not limited to, a software crash, a hardware crash, failed software launches, significantly higher CPU and/or memory usage than average usage, network disconnections, etc.

In some aspects, update server 202 may monitor whether a computing node of the plurality of computing nodes has an active status (e.g., whether the node is alive or dead) based on whether communication is received from a respective instance installed on the computing node. In response to determining that the computing node does not have an active status, update server 202 may rebalance an amount of links in the first subset of deployed links and the second subset of deployed links. For example, update server 202 may remove the link from a list of active links and may update the distribution of links point to a specific update location (i.e., fewer links point to an update location may mean that the update location can be the destination of other links managed by update server 202).

Figure 9:
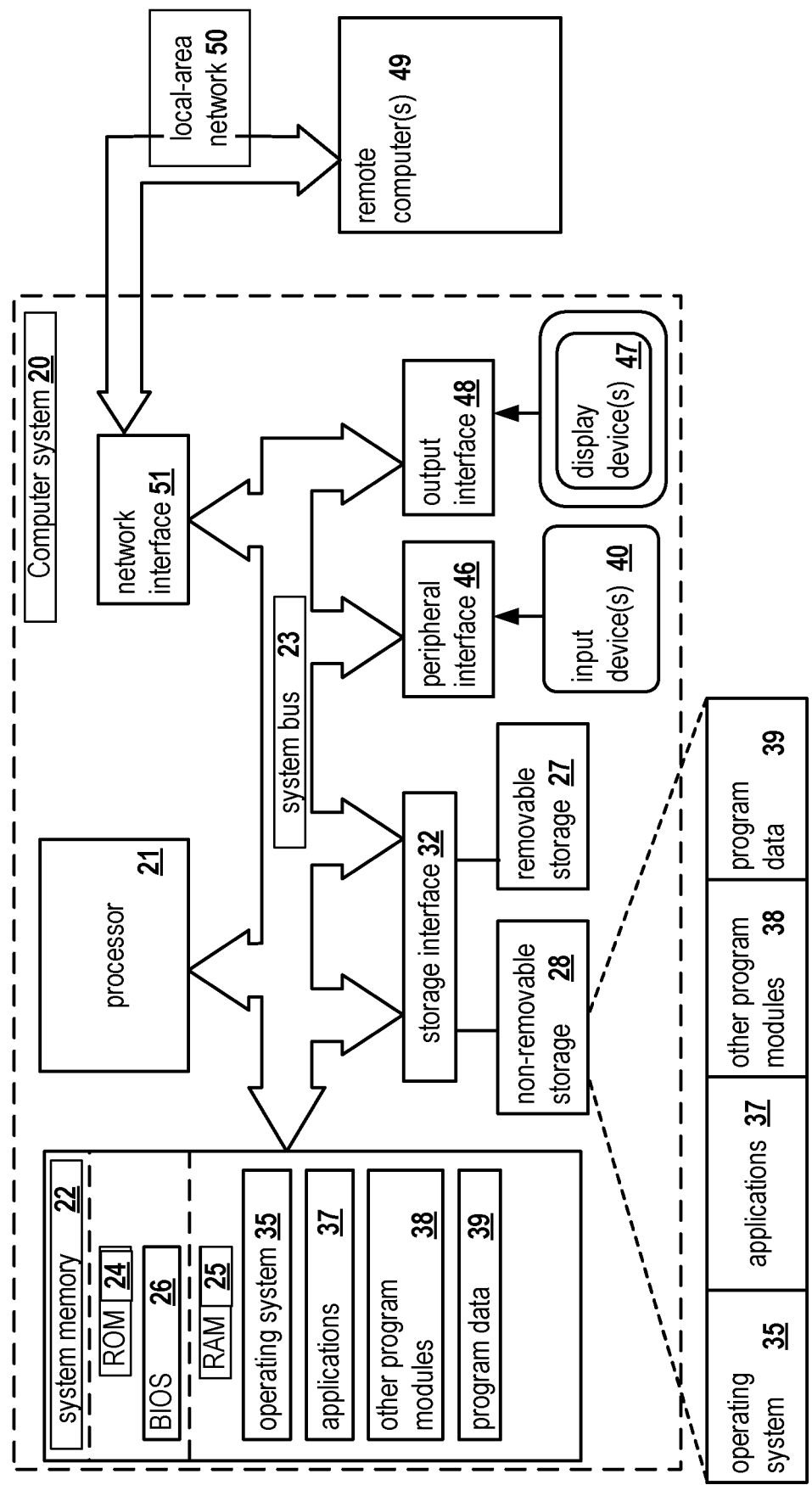
FIG. 9 presents an example of a general-purpose computer system on which aspects of the present disclosure can be implemented.

FIG. 9 is a block diagram illustrating a computer system 20 on which aspects of systems and methods for gradually updating a software object on a plurality of computing nodes may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-8 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure. [76] In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for gradually updating software object instances on a plurality of computing nodes, the method comprising:
   in response to receiving a notification from a software object instance of a plurality of software object instances installed on a plurality of computing nodes, registering the software object instance at an update server;
   storing and deploying a plurality of links, wherein each deployed link uniquely corresponds to a registered software object instance;

associating two or more subsets of the plurality of links with two or more update locations, in accordance with an update policy;

placing an update to the software object instance at the two or more update locations in accordance with an update policy, wherein the update policy defines a distribution of computing nodes that are allowed to receive the update via each of the two or more update locations and time latencies between placing the update at different update locations, wherein placing the update further comprises:

placing, at a first time by the update server, the update at a first update location of the two or more update locations;

placing, at a second time by the update server, the update at a second update location of the two or more update locations;

monitoring whether a computing node of the plurality of computing nodes has an active status based on whether communication is received from a respective instance installed on the computing node, wherein the respective instance of the computing node accesses the update via a respective link associated with the first update location; and in response to determining that the computing node does not have an active status, rebalancing an amount of links associated with the first update location and the second update location; and in response to receiving an update request via a link from a computing node, redirecting the update request to an update location associated with the link.

2. The method of claim 1, wherein redirecting the update request further comprises:

verifying a license key of the software object instance; and in response to determining that the license key is valid, redirecting the update request.

3. The method of claim 1, further comprising determining respective deployed links of the plurality of links to associate with the first update location and the second update location.

4. The method of claim 1, wherein a first cluster of the plurality of computing nodes is to be updated before a second cluster of the plurality of computing nodes based on the update policy, and wherein links of the first cluster are associated with the first update location and wherein links of the second cluster are associated with the second update location.

5. The method of claim 1, further comprising:

prior to placing the update at the second update location, determining whether a functionality or performance issue in instances retrieving the update from the first update location was detected subsequent to updating the software object instance via the first update location; and in response to determining that the functionality or performance issue was not detected, placing the update at the second update location.

6. The method of claim 1, wherein registering the software object instance further comprises:

storing, at the update server, a plurality of attributes of the software object instance, wherein the plurality of attributes includes at least one of: a hardware ID, a software version, and a cluster ID.

7. A system for gradually updating software object instances on a plurality of computing nodes, the system comprising:

at least one hardware processor configured to:

in response to receiving a notification from a software object instance of a plurality of software object instances installed on a plurality of computing nodes, register the software object instance at an update server;

store and deploy a plurality of links, wherein each deployed link uniquely corresponds to a registered software object instance;

associate two or more subsets of the plurality of links with two or more update locations, in accordance with an update policy;

place an update to the software object instance at the two or more update locations in accordance with an update policy, wherein the update policy defines a distribution of computing nodes that are allowed to receive the update via each of the two or more update locations and time latencies between placing the update at different update locations, wherein placing the update further comprises:

placing, at a first time by the update server, the update at a first update location of the two or more update locations;

placing, at a second time by the update server, the update at a second update location of the two or more update locations;

monitoring whether a computing node of the plurality of computing nodes has an active status based on whether communication is received from a respective instance installed on the computing node, wherein the respective instance of the computing node accesses the update via a respective link associated with the first update location; and in response to determining that the computing node does not have an active status, rebalancing an amount of links associated with the first update location and the second update location; and in response to receiving an update request via a link from a computing node, redirect the update request to an update location associated with the link.

8. The system of claim 7, wherein the at least one hardware processor is further configured to redirect the update request by:

verifying a license key of the software object instance; and in response to determining that the license key is valid, redirecting the update request.

9. The system of claim 7, wherein the at least one hardware processor is further configured to determine respective deployed links of the plurality of links to associate with the first update location and the second update location.

10. The system of claim 7, wherein a first cluster of the plurality of computing nodes is to be updated before a second cluster of the plurality of computing nodes based on the update policy, and wherein links of the first cluster are associated with the first update location and wherein links of the second cluster are associated with the second update location.

11. The system of claim 7, wherein the at least one hardware processor is further configured to:

prior to placing the update at the second update location, determine whether a functionality or performance issue in instances retrieving the update from the first update location was detected subsequent to updating the software object instance via the first update location; and in response to determining that the functionality or performance issue was not detected, place the update at the second update location.

12. The system of claim 7, wherein the at least one hardware processor is further configured to register the software object instance by:
storing, at the update server, a plurality of attributes of the software object instance, wherein the plurality of attributes includes at least one of: a hardware ID, a software version, and a cluster ID.

13. A non-transitory computer readable medium storing thereon computer executable instructions for gradually updating software object instances on a plurality of computer nodes, including instructions for:
in response to receiving a notification from a software object instance of a plurality of software object instances installed on a plurality of computing nodes, registering the software object instance at an update server;
storing and deploying a plurality of links, wherein each deployed link uniquely corresponds to a registered software object instance;
associating two or more subsets of the plurality of links with two or more update locations, in accordance with an update policy;
placing an update to the software object instance at the two or more update locations in accordance with an update policy, wherein the update policy defines a distribution of computing nodes that are allowed to receive the update via each of the two or more update locations and time latencies between placing the update at different update locations, wherein placing the update further comprises:
placing, at a first time by the update server, the update at a first update location of the two or more update locations;
placing, at a second time by the update server, the update at a second update location of the two or more update locations;
monitoring whether a computing node of the plurality of computing nodes has an active status based on whether communication is received from a respective instance installed on the computing node, wherein the respective instance of the computing node accesses the update via a respective link associated with the first update location; and
in response to determining that the computing node does not have an active status, rebalancing an amount of links associated with the first update location and the second update location; and
in response to receiving an update request via a link from a computing node, redirecting the update request to an update location associated with the link.

* * * * *